(12) United States Patent
Amtmann et al.

(10) Patent No.: US 7,834,741 B2
(45) Date of Patent: Nov. 16, 2010

(54) DATA CARRIER CIRCUIT CAPABLE OF SUPPLYING IDENTIFICATION INFORMATION TO A COMMUNICATIONS ARRANGEMENT

(75) Inventors: Franz Amtmann, Graz (AT); Ewald Bergler, Weiz (AT); Roland Brandl, Graz (AT); Hubert Watzinger, Graz (AT)

(73) Assignee: NXP B.V., Eindhoven (NL)

( * ) Notice: Subject to any disclaimer, the term of this patent is extended or adjusted under 35 U.S.C. 154(b) by 1216 days.

(21) Appl. No.: 10/575,833

(22) PCT Filed: Oct. 12, 2004

(86) PCT No.: PCT/IB2004/052065

§ 371 (c)(1), (2), (4) Date: Apr. 13, 2006

(87) PCT Pub. No.: WO2005/038697

PCT Pub. Date: Apr. 28, 2005

(65) Prior Publication Data

US 2007/0021077 A1 Jan. 25, 2007

(30) Foreign Application Priority Data

Oct. 15, 2003 (EP) .................................. 03103823

(51) Int. Cl.
*H04Q 5/22* (2006.01)
(52) U.S. Cl. ................. 340/10.2; 340/3.41; 340/825.52
(58) Field of Classification Search ................ 340/10.1, 340/10.2, 10.31, 825.52, 572.1; 370/346, 370/310; 426/392
See application file for complete search history.

(56) References Cited

U.S. PATENT DOCUMENTS

| 5,751,570 A | 5/1998 | Stobbe et al. |
| 2002/0130766 A1* | 9/2002 | Hulvey ..................... 340/10.31 |
| 2003/0122654 A1* | 7/2003 | Kalinowski et al. ........ 340/10.1 |

* cited by examiner

Primary Examiner—George A Bugg

(57) ABSTRACT

Circuit for a data carrier, which circuit is capable of supplying identification information to a communications arrangement. A circuit (4) for a data carrier (3), which is able to communicate contactlessly with a communications arrangement (2), is provided with a memory stage (5) for storing identification information (II) consisting of information units and suppliable to the communications arrangement (2) and with a signal-processing stage (25) for processing an indicator signal (IS), which indicator signal (IS) indicates a substantially simultaneous appearance of two different information units, of which two different information units the one information unit is contained in the identification information (1[I) stored in the memory stage (5) of the circuit (4) and the other information unit is contained in different identification information (II') stored in a memory stage of a different circuit (4'), and which indicator signal (IS) is generated by the communications arrangement (2) upon detection of such a substantially simultaneous appearance of different information units and is communicated to the circuit (4), wherein the signal-processing stage (25), as a consequence of a processing of the indicator signal (IS), is arranged to interrupt the supply of the identification information (II) after the appearance of the information unit that has caused the indicator signal (IS) and to flag at least the information unit that has caused the indicator signal (IS).

14 Claims, 2 Drawing Sheets

DATA CARRIER CIRCUIT CAPABLE OF SUPPLYING IDENTIFICATION INFORMATION TO A COMMUNICATIONS ARRANGEMENT

The invention relates to a circuit for a data carrier, which data carrier comprises an interface for contactless communication with a communications arrangement, wherein the circuit comprises memory means for storing identification information consisting of information units, which identification information is capable of being supplied via the interface to the communications arrangement, and wherein the circuit comprises signal processing means that are arranged to receive and process an indicator signal, which indicator signal indicates a substantially simultaneous appearance of two different information units, of which two different information units the one information unit is contained in the identification information stored in the memory stage of the circuit and the other information unit is contained in different identification information stored in a memory stage of a different circuit, and which indicator signal is generated by the communications arrangement upon detection of such a substantially simultaneous appearance of different information units and is communicated to the circuit.

The invention relates furthermore to a data carrier having a circuit of the kind specified in the first paragraph.

The invention relates furthermore to a method for supplying identification information stored by means of a circuit for a data carrier to a communications arrangement via an interface of the data carrier arranged for contactless communication, which method comprises the method steps specified below, namely, supplying the identification information in the form of information units via the interface to the communications arrangement and receiving and processing an indicator signal, which indicator signal indicates a substantially simultaneous appearance of two different information units, of which two different information units the one information unit is contained in the identification information stored in a memory stage of the circuit and the other information unit is contained in different identification information stored in a memory stage of a different circuit, and which indicator signal is generated by the communications arrangement upon detection of such a substantially simultaneous appearance of different information units and is communicated to the circuit.

The invention relates furthermore to a communications arrangement, wherein the communications arrangement comprises an interface for contactless communication with a data carrier, via which interface identification information in the form of information units capable of being supplied by the data carrier can be received, and wherein the communications arrangement comprises collision-detection means, which collision-detection means are arranged to detect a substantially simultaneous appearance of two different information units, of which two different information units the one information unit originates from the data carrier and the other information unit originates from a different data carrier, and which collision-detection means are arranged to generate an indicator signal and to supply the indicator signal via the interface, which indicator signal indicates the detection of the substantially simultaneous appearance of the two different information units.

Such a circuit of the kind specified initially in the first paragraph and such a data carrier of the kind specified initially in the second paragraph and such a method of the kind specified initially in the third paragraph and such a communications arrangement of the kind specified initially in the fourth paragraph are known from the patent document U.S. Pat. No. 5,751,570.

In the case of the known data carrier, a circuit is provided, which has memory means by which identification information consisting of information units for clear identification of the data carrier is stored. The data carrier comprises an interface partially realized by circuit sections of the circuit and by means of which, upon enquiry by a communications arrangement, the identification information is supplied contactlessly to the enquiring communications arrangement by means of a carrier signal retrieved from the communications arrangement for the purpose of energy supply of the data carrier by load modulation of the carrier signal. In that process, the identification information is communicated serially in the form of its information units, that is, bit by bit, to the communications arrangement. The communications arrangement is arranged to detect a so-called collision at a bit position of the identification information entering at the communications arrangement. To detect a collision, the communications arrangement has a collision-detection stage. Such a collision is distinguished in that, for example, the data carrier supplies a bit having the value "1" to the communications arrangement substantially at the same time as another data carrier supplies a bit having the value "0". As a consequence of detecting the two substantially simultaneously appearing yet different information units, the communications arrangement transmits by means of the carrier signal an indicator signal to indicate this event, that is, the occurrence of a collision, which indicator signal is received at the data carriers and processed.

In the case of the known data carrier and the known communications arrangement, the problem arises that the indicator signal received at the data carrier is used for complete termination of the supply of the identification information, and that the supply of the identification information is restarted at the earliest only after elapse of a time interval calculated by means of a random number and after the elapse of this time interval the identification information is completely supplied afresh, namely, from that data carrier at which the shortest time interval was calculated. In order during this supply of identification information not to provoke a new collision, shortly after the new start of receiving information units of the identification information the communications arrangement has to transmit a further signal, that is, a so-called "busy signal", so that all other remaining data carriers are silent until, after the identification information of the data carrier enjoying the shortest time interval has been completely transmitted, they again receive an enquiry relating to their identification information. Thereafter, the remaining data carriers again start to supply their identification information optionally simultaneously, until again a collision is indicated by the indicator signal and again a data carrier from the group of remaining data carriers is selected from among this group by calculation of the shortest time interval. This process, which is also generally known as an anti-collision process or inventarizing process, is repeated until all data carriers have supplied their identification information completely and above all without the occurrence of a collision. In this connection, the problem arises that the calculation of such a random number is time-consuming and suitably designed means for that purpose are necessary in the data carrier. Furthermore, such a data carrier and such a communications arrangement are impractical for cases of application in which a relatively high number of such data carriers is brought virtually simultaneously within a communication area of the communications arrangement and the identification information of all data carriers has to be detected as quickly as possible. In such a case of application, the time-consuming process of waiting for elapse of the time interval and the subsequent re-supplying of the complete identification information are disadvantageous, because quick and efficient transmission of all identification information to the communications arrangement is utterly impossible.

It is an object of the invention to avoid the above-mentioned problems in a circuit of the kind specified initially in the first paragraph and in a data carrier of the kind specified initially in the second paragraph and in a method of the kind specified initially in the third paragraph and in a communications arrangement of the kind specified initially in the fourth paragraph, and to produce an improved circuit and an improved data carrier and an improved method and an improved communications arrangement.

To achieve the above-mentioned object, features according to the invention are provided in a circuit according to the invention, so that a circuit according to the invention can be characterized in the manner specified below, namely:

Circuit for a data carrier, which data carrier comprises an interface for contactless communication with a communications arrangement, wherein the circuit comprises memory means for storing identification information consisting of information units, which identification information is capable of being supplied via the interface to the communications arrangement, and wherein the circuit comprises signal processing means that are arranged to receive and process an indicator signal, which indicator signal indicates a substantially simultaneous appearance of two different information units, of which two different information units the one information unit is contained in the identification information stored in the memory stage of the circuit and the other information unit is contained in different identification information stored in a memory stage of a different circuit, and which indicator signal is generated by the communications arrangement upon detection of such a substantially simultaneous appearance of different information units and is communicated to the circuit, and wherein the signal processing means, as a consequence of receiving and processing the indicator signal, are arranged, firstly, to interrupt the supply of identification information that has caused the indicator signal and are arranged, secondly, to flag at least the information unit that has caused the indicator signal.

To achieve the above-mentioned object, a data carrier according to the invention is provided with a circuit according to the invention.

To achieve the above-mentioned object, features according to the invention are provided in a method according to the invention, so that a method according to the invention can be characterized in the manner specified below, namely:

Method for supplying identification information stored by means of a circuit for a data carrier to a communications arrangement via an interface of the data carrier arranged for contactless communication, which method comprises the method steps specified below, namely, supplying the identification information in the form of information units to the communications arrangement via the interface, and receiving and processing an indicator signal, which indicator signal indicates a substantially simultaneous appearance of two different information units, of which two different information units the one information unit is contained in the identification information stored in a memory stage of the circuit and the other information unit is contained in different identification information stored in a memory stage of a different circuit, and which indicator signal is generated by the communications arrangement upon detection of such a substantially simultaneous appearance of different information units and is communicated to the circuit, and interrupting the supply of identification information as a consequence of receipt and processing of the indicator signal after the supply of the information unit that has caused the indicator signal, and flagging of at least the information unit that has caused the indicator signal.

To achieve the above-mentioned object, features according to the invention are provided in a communications arrangement according to the invention, so that a communications arrangement according to the invention can be characterized in the manner specified below, namely:

Communications arrangement, wherein the communications arrangement comprises an interface for contactless communication with a data carrier, via which interface identification information suppliable by the data carrier can be received in the form of information units, and wherein the communications arrangement comprises collision-detection means, which collision-detection means are arranged to detect a substantially simultaneous appearance of two different information units, of which two different information units the one information unit originates from the data carrier and the other information unit originates from a different data carrier, and which collision-detection means are arranged to generate an indicator signal and to supply the indicator signal via the interface, which indicator signal indicates the detection of the substantially simultaneous appearance of the two different information units, and wherein the communications arrangement comprises information unit-processing means, which, as a consequence of the detection of such a substantially simultaneous appearance of the different information units by the collision-detection means, are arranged to store and to process every information unit that has appeared before the information unit that has caused the indicator signal.

By providing the measures according to the invention, the advantage is gained that in the event of a collision of an information unit originating from a circuit according to the invention with an information unit originating from a different circuit according to the invention, the information units already supplied have not been supplied pointlessly as a waste of time without prospect of being used subsequently, because on the basis of the flagged information unit that has caused the indicator signal a decision can be made in the circuit as to whether the remaining information units not yet supplied should be supplied or not. Furthermore, in a communications arrangement the advantage is gained that the information units already received are available for further processing despite a collision that has occurred, and are not, as in the prior art, simply discarded. A requirement is therefore made that even in the case of a relatively large number of data carriers that are simultaneously located in a communication area of a communications arrangement, it is ensured that each data carrier is able to supply its identification information quickly and reliably to the communications arrangement as far as possible without a time-consuming repetition of the entire identification information.

In the case of one solution according to the invention, provision can be made, for example, to decide whether the indicator signal was received or not, for voltage ramp-evaluating means to be provided, which are arranged to detect and to evaluate voltage ramps that occur in the circuit during contactless communication via the interface. By means of the voltage ramp-evaluating means, it is possible to establish, for example, that for the purpose of indicating the two simultaneously appearing different information units the amplitude of a carrier signal generated by means of the communications arrangement was changed for a time interval after the simultaneous appearance of the two different information units, whereby a voltage ramp occurs after the supply of the information unit that has caused the indicator signal, which differs from the voltage ramp caused by a carrier signal of unchanged amplitude. In the case of one solution according to the invention, provision can furthermore be made for code-monitoring means to be provided for the above-specified purpose, by means of which a corruption of a code used during supply of the information units is considered as in indication of the receipt of the indicator signal. It has proved especially advantageous, however, when additionally the measures as claimed in claim 2 and claim 8 respectively are provided. The advantage is thereby gained that receipt of the indicator signal is achievable by simple comparison of the information unit appearing at the interface with the information unit present in the circuit and supplied to the interface, since at the interface during receipt of the indicator signal there is an overlay between an information unit being supplied and the indicator signal, and this overlay differs from the information unit supplied from the circuit.

In one solution according to the invention, provision can be made, for example, for both the information unit and the particular position of the information unit in the identification information to be stored. It has proved especially advantageous, however, when additionally the measures as claimed in claim 3 and claim 9 respectively are provided. The advantage is thereby gained that only a so-called pointer to the particular information unit has to be stored, thereby rendering possible a processing of identification information that is as economical as possible in terms of memory requirement, since the identification information is normally stored unalterably and creating a copy of information units of the identification information would merely occupy memory space without being of any additional advantage.

In one solution according to the invention, it can be provided, for example, that as a consequence of receiving a control signal, by means of which the information unit that has caused the indicator signal is determined or defined, the identification information is completely re-supplied immediately thereafter or with a time delay thereafter, if the information unit determined by the control signal is identical with the information unit that has caused the indicator signal. It has proved especially advantageous, however, when additionally the measures as claimed in claim 4 and claim 10 and claim 13 respectively are provided. The advantage is thereby gained that the supply of identification information from that circuit in which the information unit that has caused said indicator signal is identical with the information unit determined by the control signal, is continued with the information unit following the information unit that has caused the indicator signal. The further advantage is thereby gained that the circuit satisfying the above-specified criterion is selected by means of the control signal without any time-consuming bi-directional communication and a repetition of the transmission of the information unit that has caused the indicator signal is even omitted, thus realizing an anti-collision method that is as efficient as possible.

In one solution according to the invention, provision can be made, for example, for the control signal to be received immediately subsequent to the indicator signal or after an elapse of a time interval after the appearance of the indicator signal and is therefore processed also independently of indicator signal. It has proved especially advantageous, however, when additionally the measures as claimed in claim 5 and claim 1 and claim 14 respectively are provided. The advantage is thereby gained that the continuation of the supply of identification information is affected virtually without delay even on the appearance of two different information units, since no repetition of the information unit that has caused the indicator signal is necessary after the processing of the indicator signal and virtually no waiting time until the continuation of the supply of identification information with the next information unit, that is, with the information unit following the information unit that has caused the indicator signal, is necessary.

It should be mentioned that the advantages listed in connection with the circuit come into effect also in the case of a data carrier according to the invention as claimed in claim 6, which has a circuit according to the invention as claimed in any one of claims 1 to 5.

These and other aspects of the invention are apparent from and will be elucidated, by way of non-limitative example, with reference to the embodiment described hereinafter.

Figure 1:
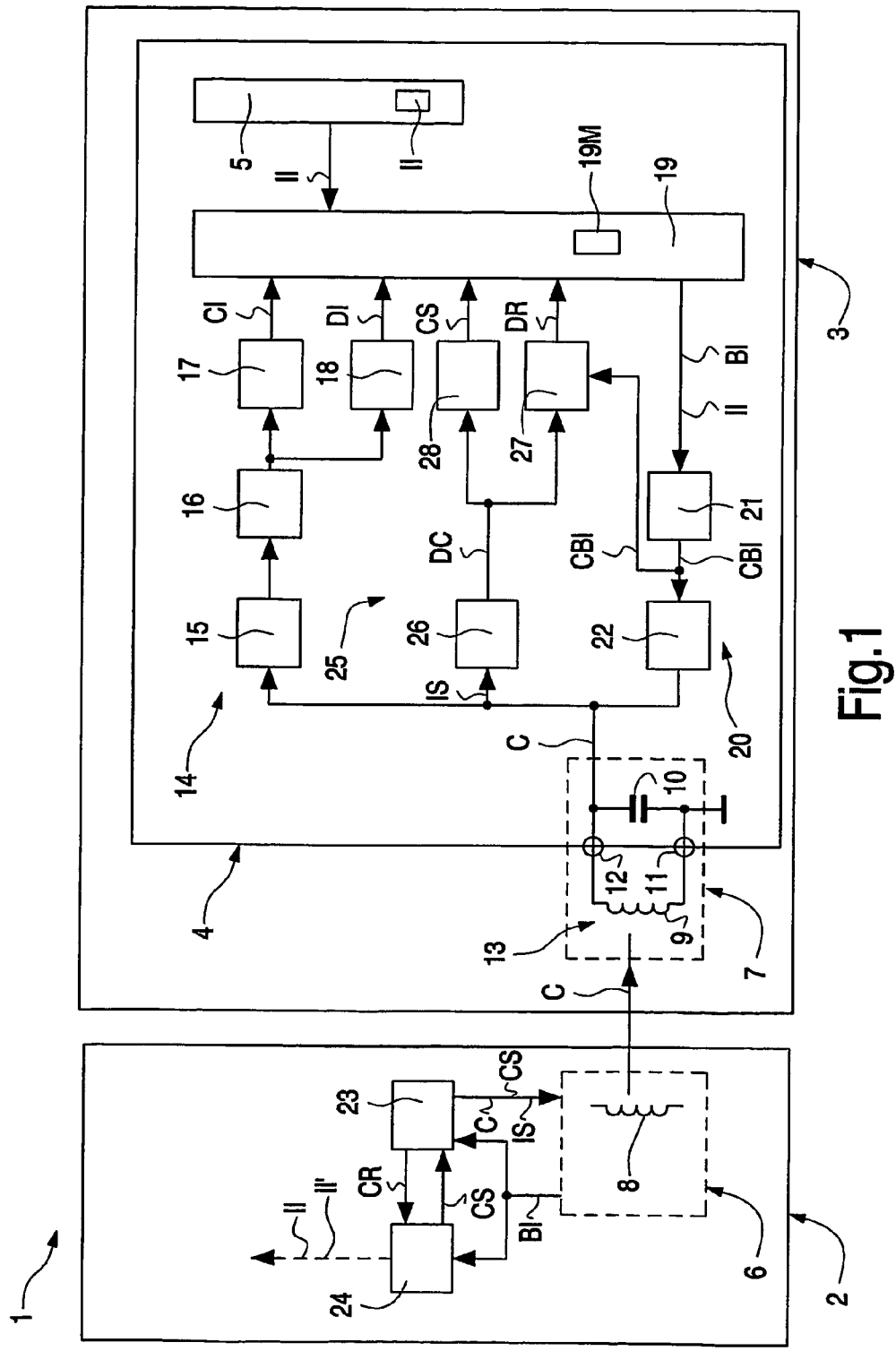
FIG. 1 shows schematically in the form of a block diagram a communications system with a data carrier having a circuit according to an exemplary embodiment of the invention and having a communications arrangement according to an exemplary embodiment of the invention.

FIG. 1 illustrates a communications system, which is hereinafter called system 1 for short and which is arranged in accordance with the standard for contactless communication ISO 14443. The system 1 comprises a communications arrangement 2 and a plurality of data carriers, of which data carriers only one data carrier 3 is illustrated in FIG. 1.

The data carrier 3 comprises a circuit 4, which is in the form of an integrated circuit and includes the memory means 5. The memory means 5 are provided for storage of identification information II consisting of information units, namely of bits. In order to permit specific communication processes within the system 1 between the communications unit 2 and the data carrier 3, the data carrier 3 must first supply its identification information II to the communications arrangement 2 in order clearly to identify itself to the communications arrangement 2, whereby it is ensured that upon a communication process communication takes place only between this one data carrier 3 and the communications arrangement 2, since also several data carriers 3 can be arranged in a communication area of the communications arrangement 2.

For this purpose, the communications arrangement 2 comprises a first interface 6 and the data carrier 3 comprises a second interface 7, via which two interfaces 6 and 7 the communications arrangement 2 and the data carrier 3 are able to communicate according to the standard ISO 14443. Of the first interface 6, only a first communication coil 8 is illustrated in FIG. 1. Of the second interface 7, a second communication coil 9 is illustrated in FIG. 1. The circuit 4 furthermore comprises a capacitor 10, which is connected by means of a first circuit connection 11 and a second circuit connection 12 with the second communication coil 9 and together with the second communication coil 9 forms a resonant circuit 13. As soon as the data carrier 3 is brought into the communication area of the communications arrangement 2, an inductive coupling exists between the communications arrangement 2 and the data carrier 3, so that a carrier signal C producible in the communications arrangement 2 can be transmitted from the first communication coil 8 to the second communication coil 9 and consequently the carrier signal C can be fed to the circuit 4 for the purpose of energy supply and for the purpose of information exchange with the communications arrangement 2, a situation with which the expert has long been familiar.

For the purpose of receiving information to be communicated from the communications arrangement 2 to the data carrier 3, the data carrier 3 comprises receiving means 14, which are realized by a demodulator stage 15 connected with the second interface 7 and by a decoding stage 16 connected with the demodulator stage 15 and by a command-detection stage 17 connected with the decoding stage 16 and by a data-detection stage 18 also connected with the decoding stage 16. Since the realization and the function of the receiving means 14 are sufficiently well known to the expert, at this stage it will merely be pointed out that command information CI, such as an identification information-enquiry command, contained in the carrier signal C, can be detected and supplied by means of the command-detection stage 17 and data information DI contained in the carrier signal C can be detected and supplied by means of the data-detection stage 18.

The circuit 4 furthermore comprises sequence control means 19, which are arranged to receive the command information CI and the data information DI and to control the processing of the command information CI and the data information DI. The sequence control means 19 are furthermore arranged to access the memory means 5 and to control the processing of further information, for example, to retrieve the identification information II stored in the memory means 5 as a consequence of the processing of the identification information-enquiry command CI.

The sequence control means 19 are furthermore arranged to supply transmit information BI, for example, the identification information II in the form of information units, that is, in the form of bits in the present case.

For the purpose of supplying the transmit information BI to the communications arrangement 2, the circuit 4 comprises transmission means 20, which are arranged to receive the transmit information BI and in dependence on the transmit information BI to generate load-modulated signal sections and unmodulated signal sections in the carrier signal C. For that purpose, the transmission means 20 comprise an encoding stage 21, which is arranged to encode in accordance with the Manchester code and which is connected with the sequence control means 19 and which is arranged to receive the transmit information BI and to generate encoded transmit information CBI representing the transmit information BI. The transmission means 20 furthermore comprise a modulator stage 22, which is connected with the encoding stage 21 and which is arranged to receive the encoded transmit information CBI and to load-modulate the carrier signal C appearing at the second circuit connection 12 of the interface 7. It should be mentioned at this point that an auxiliary carrier can also be provided, which in its turn can be encoded in accordance with the Manchester code. Furthermore, other codes could alternatively be used, such as the so-called FM0 code, which is used, for example in the UHF range, or the F2F code.

In the case of the communications arrangement 2, the information units supplied from the data carrier 3 are receivable by means of the first interface 6. In order, however, to embrace the case mentioned in the introduction, that is, that several data carriers 3 are arranged within the communication area of the communications arrangement 2 and supply their identification information II in the form of the information units substantially simultaneously, the communications arrangement 2 comprises collision-detection means 23, which are connected with the first interface 6 and which are arranged to detect a substantially simultaneous appearance of two different information units, of which two different information units the one information unit originates from the data carrier 3 and the other information unit originates from a different data carrier, which is not illustrated in FIG. 1. As a consequence of detecting the simultaneous appearance of the two different information units, the collision-detection means 23 are arranged to generate an indicator signal IS and to supply the indicator signal IS via the first interface 6, which indicator signal IS indicates the detection of the substantially simultaneous appearance of the two different information units and is provided for the data carrier 3, as is provided for in the prior art. The collision-detection means 23 are furthermore arranged to supply a collision-detection signal CR, which is provided for internal processing in the communications arrangement 2 and represents the detection state indicated by the indicator signal IS.

The communications arrangement 2 furthermore comprises information unit-processing means 24, which are connected with the first interface 6 and which are arranged for successive receipt of the information units transmitted from the data carrier 3. The information unit-processing means 24 are furthermore arranged to receive the collision-detection signal CR, which can be supplied to them from the collision-detection means 23. As a consequence of receiving the collision-detection signal CR, the information unit-processing means 24 are arranged to store and to process every information unit that has appeared before the information unit that has caused the indicator signal.

The information unit-processing means 24 are additionally arranged to determine that information unit that has caused the indicator signal IS, this information unit being determined in such a way that it represents the binary value ONE. The information unit-processing means 24 are furthermore arranged to generate a control signal CS and to supply the control signal CS to the collision-detection means 23, which control signal CS is provided to determine that information unit that has caused the indicator signal IS, that is, in the present case to determine the information unit on the binary value ONE, so that the information unit determined in respect of its binary value is available for supply via the first interface 6 to the second interface 7.

The information unit-processing means 24 are furthermore arranged, subsequently to the supply of the control signal CS, to store and to process the information unit determined by the control signal CS together with every information unit that has appeared before the information unit that has caused the indicator signal IS, so that the determined information unit replaces the information unit that has caused the indicator signal IS, as though this determined information unit had been received by a data carrier 3.

The collision-detection means 23 are furthermore arranged to receive the control signal CS from the information unit-processing means 24 and to supply the control signal CS as a component of the indicator signal IS. Here, provision is made for the carrier signal C generated unchanged in respect of its amplitude in the conventional manner, that is in accordance with the prior art, during receipt of the information units, to be subjected to a modulation for the purpose of supplying the indicator signal IS through the communications arrangement 2 and for the control signal CS to be represented by a further modulated signal section, through a further modulation within the modulated signal section of the carrier signal representing the indicator signal IS. At the same time, for example, the indicator signal IS can be defined by a brief modulation depth of 90% and the control signal can be defined by a brief modulation depth of 30% within the signal section that has the modulation depth of 90%. It should be pointed out here that even the appearance of the indicator signal IS on its own in the carrier signal C can by definition represent one of the two possible binary values ONE or ZERO, but this can represent a limitation as regards maximum flexibility of the area of application for the system 1.

The data carrier 3 furthermore comprises signal processing means 25, which are arranged to receive and to process the indicator signal IS and the control signal CS. For that purpose, the signal processing means 25 comprise a second demodulator stage 26 and a decision stage 27. The second demodulator stage 26 is connected with the second interface 7 and is arranged to demodulate the carrier signal C received via the second interface 7 and to supply the demodulated carrier signal DC to the decision stage 27. Instead of the second demodulator stage 26, the first demodulator stage 15 of the information-receiving means 14 can be used for the signal processing means 25. The decision stage 27 is furthermore arranged to receive the encoded transmit information CBI from the encoding stage 21 and with the help of the encoded transmit information CBI is arranged to decide whether the carrier signal C contains the indicator signal IS. At the same time, a decision is made as to whether the particular information unit to be supplied, which is present within the circuit 4 as encoded transmit information CBI, is identical with that information that is present at the interface 7 in the form of the modulation of the carrier signal C. If the communications arrangement 2 modulates the carrier signal C with the indicator signal IS, the information appearing at the second interface 7 is no longer consistent with the encoded transmit information CBI, the result of which is that the decision stage 27 supplies decision result information DR that represents the inconsistency and is supplied to the sequence control means 19.

The sequence control means 19 comprise a memory stage 19M, which is formed by an internal register, by means of which the position of the information unit that has caused the indicator signal IS can be stored within the identification information II. The signal processing means 25 furthermore comprise a control signal-detection stage 28 connected with the second demodulator stage 26 and arranged to detect the control signal CS and to supply that information unit that is determined by the control signal CS to the sequence control means 19. Accordingly, the signal processing means 25 are arranged so that the control signal CS can be received and processed as a component of the indicator signal IS. The sequence control means 19 are arranged to receive the decision result information DR and the information unit determined by the control signal CS and, as a consequence of the receiving and processing of the control signal CS, to continue the supply of identification information II with the information unit following the information unit that has caused the indicator signal IS, if the information unit determined by the control signal CS is identical with the flagged information unit that has caused the indicator signal IS.

The information unit-processing means 24 are furthermore arranged to add every information unit received after the determined information unit to the information units already stored and, when the entire identification information II is present, to supply this identification information II for the purposes of communication with the data carrier 3. The advantage is thereby gained that after a collision has occurred, unnecessary repetition of information unit already supplied is omitted.

It should be mentioned at this point that several collisions occurring one after the other can also be dealt with in the above-described manner, until the identification information II in its entirety of the data carrier 3 has been received by the communications arrangement 2.

If the determined information unit is not identical with the information unit that has caused the indicator signal IS, the sequence control means 19 are arranged to stop the supply of further information units of the identification information II until a request to continue the supply of information units is received from the communications arrangement 2. Following receipt of the request to continue, supply is continued with the information unit succeeding the information unit that has caused the indicator signal IS, wherein it is implicitly assumed that now the information unit that has caused the indicator signal IS is, fixed to the binary value ZERO, which is complementary to the binary value ONE previously explicitly determined by the control signal CS.

The information unit-processing means 24 are furthermore arranged to replace the previously determined information unit with the information unit complementary thereto, and to combine the information units received after the determined information unit from a different data carrier with the information units already stored and, in the presence of the entire different identification information II received from the different data carrier, to supply this different identification information II for the purposes of communication with the different data carrier 3. Thus, in this instance too, the advantage is gained that an unnecessary repetition of information units already supplied is omitted.

Similarly, the remarks made above also apply when more than two data carriers communicate their identification information II to the communications arrangement.

The function of the communications arrangement 2 and of the data carrier 3 is discussed in the following with reference to an example of application for the system 1 according to FIG. 1.

According to this application example, it is assumed that a first data carrier 3 and a second data carrier, not illustrated in FIG. 1, are located within the communication area of the communications arrangement 2, the second data carrier being of identical construction with the first data carrier 3 and the first data carrier 3 differing from the second data carrier only in so far as the first data carrier 3 contains its first identification information II, namely the serial number "00101" and the second data carrier contains a second identification information II', namely the serial number "00001".

For the purpose of establishing communication between the communications arrangement 2 and one of the two data carriers 3, first of all the identification information-enquiry command is sent from the communications arrangement 2 by means of the carrier signal C. With the two data carriers 3, this identification information-enquiry command is received by their receiving means 14 and processed, whereupon in the data carriers 3 a procedure is started and carried out to supply their identification information II and II' stored in their circuit 4 via their interface 7 arranged for contactless communication to the communications arrangement 2. At the same time, by means of their sequence control means 19, supply of their identification information II, II' respectively in the form of information units via their interface 7 is started.

In the present case, the two data carriers 3 supply the first bit of their identification information II, II' respectively, which in both cases represents the value ZERO, substantially simultaneously to the communications arrangement 2. With the communications arrangement 2, no collision is established because the two information units originating from two different data carriers 3 are identical, and the first information unit is stored in the information unit-processing means 24. The two data carriers 3 then supply the second information unit of their identification information II, II' respectively, which in both cases represents the logical value ZERO, to the communications arrangement 2. No collision is established by the communications arrangement 2 is this case either, and the second information unit is stored by the information unit-processing means 24.

The two data carriers 3 then supply the third information unit of their identification information II, II' respectively, which in the case of the first data carrier 3 represents the logical value ZERO and in the case of the second data carrier 3' represents the logical value ONE, to communications arrangement 2. At the communications arrangement 2 a collision is thereupon established by the collision-detection means 23, namely, that two different information units have appeared substantially simultaneously. The collision-detection signal CR is thereupon supplied to the information unit-processing means 24; the information unit-processing means 24, instead of storing the different superimposed information units received via the interface 7, stores a third information unit, which represents the logical value ONE. The information unit-processing means 24 then supplies the control signal CS that represents the third information unit determined at the value ONE to the collision-detection means 23. By means of the collision-detection means 23, the carrier signal C is then amplitude-modulated, to be precise, such that the amplitude modulation represents on the one hand the indicator signal IS and on the other hand the control signal CS as a component of the indicator signal IS.

At the data carriers 3 there is then affected by the signal processing means 25 a receiving and processing of the indicator signal IS, the supply of its identification information II, II' respectively as a consequence of receiving and processing of the indicator signal IS being interrupted after the third information unit of their identification information II, II' respectively has been supplied, which information unit has caused the indicator signal IS. At the same time, at the two data carriers 3 the information unit that has caused the indicator signal IS is flagged, to be precise, such that the position of the information unit that has caused the indicator signal IS within the identification information II, II' is stored by means of the pointer to this information unit. In the present case, this is the third position.

Simultaneously with receipt of the indicator signal IS, at the data carriers 3 the control signal CS forming one component of the indicator signal IS is received via their interface 7. As a consequence of receiving and processing of the control signal CS, the supply of their identification information II, II' respectively is continued with the information unit succeeding the information unit that has caused the indicator signal IS—in the present case with the fourth information unit—to be precise only in the case of the first data carrier 3, because the information unit determined by the control signal CS is identical with the flagged information unit that has caused the indicator signal IS, that is, represents the value ONE.

Since in the case of the second data carrier 3 the third information unit represents the value ZERO, the supply of the second identification information II' at the third position is stopped until the second data carrier receives a request to continue the supply of the second identification information II'.

The first data carrier 3 then supplies the fourth information unit having the value ZERO, and in consequence also the fifth information unit having the value ONE, without collision, because in the present example only the two data carriers 3 are present within the communication area of the communications arrangement 2 and because the second data carrier supplies no more information units after receiving the indicator signal IS and evaluation of the control signal CS contained in the indicator signal IS.

If more than two data carriers 3 are present within the communication area, it may also happen in that case that at several positions of its identification information a collision could occur between information units that originate from different data carriers 3. In analogy with the above remarks, that particular data carrier, or also a group of data carriers, will then continue with supply of its/their identification information in which the information unit that has caused the indicator signal IS is identical with the information unit determined by the communications arrangement 2. In the present case, it was assumed that this determined information unit always represents the value ONE. It should be mentioned, however, that fixing the information unit at one of the two values ONE or ZERO or even on the basis of a random principle, can be affected.

Once the communications arrangement 2 has received the complete first information unit II of the first data carrier 3, the communications arrangement 2 sends out an identification information-continuation command, which is ignored by the first data carrier 3 since this has already completely supplied its first identification information II. At the second data carrier, this identification information-continuation command causes supply of the second identification information II' at the fourth position with the information unit representing the value ZERO to be continued. Subsequently, the fifth information unit having the value ONE of the second identification information II' is also supplied, without collision, to the communications arrangement 2. For the purpose of completing the second identification information II', in the communications arrangement 2, whilst avoiding a communication with the data carrier 3, the information unit for the second data carrier, which information unit has caused the indicator signal IS, is determined at the value ZERO, which is complementary to the value ONE previously determined for the third information unit, and the information units that appeared before the appearance of the indicator signal IS are supplemented with the information units still outstanding from the second data carrier.

The advantage is thereby gained that although on transfer of the information units II and II' a collision has occurred at the third information unit, each of the two data carriers 3 has to supply its entire identification information II, II' respectively to the communications arrangement 2 only once, and that the information units validly entered at the communications arrangement 2 prior to the occurrence of the collision are not lost, in contrast to the prior art, but are retained and utilized to complete the successively transmitted information units II and II'. Furthermore, the advantage is gained that the information unit that has caused the indicator signal IS is determined or defined by the communications arrangement 2 itself and by means of this determined information unit, which is communicated to the data carriers 3 by means of the control signal CS, at the same time one of the two data carriers 3 is selected to continue supply of its identification information II, II' respectively.

It should be mentioned that in the above-described example of application the continuation of the supply of the second identification information II' can also be started autonomously by the second data carrier, if this is arranged to monitor the signals appearing in the carrier signal C and to establish that a data carrier 3 previously selected by means of the control signal CS has supplied all of its information units. This can be affected in the knowledge of the number of information units to be transmitted by counting the total information units transmitted. This can also be affected however, by evaluation of a command of the communications arrangement 2 indicating complete receipt of the first identification information II.

It should be mentioned at this point that antenna configurations or capacitively effective transmission configurations can be provided instead of the two communication coils 8, 9.

It should furthermore be mentioned that instead of a change in the amplitude of the carrier signal for the purpose of supplying the indicator signal IS, a change in the phase or the frequency can be provided.

It should furthermore be mentioned at this point that the indicator signal IS can also be formed by a pulse or by pulse sequences in the carrier signal. Accordingly, in such a case the decision stage must be arranged to evaluate this indicator signal IS.

Figure 2:
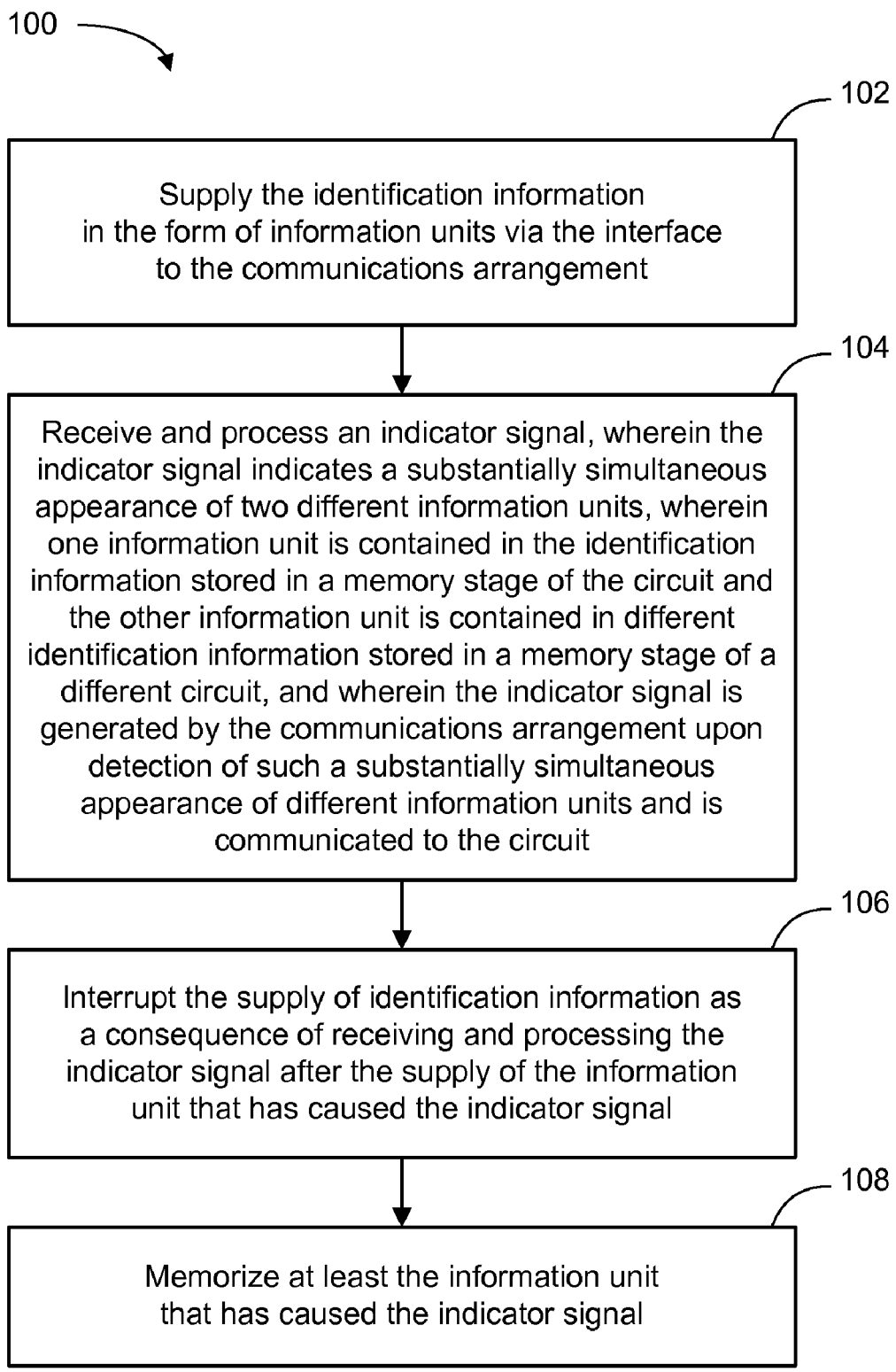
FIG. 2 shows a flow chart diagram of one embodiment of a method for supplying identification information stored by means of a circuit for a data carrier to a communications arrangement via an interface of the data carrier arranged for contactless communication.

FIG. 2 shows a flow chart diagram of one embodiment of a method 100 for supplying identification information stored by means of a circuit for a data carrier to a communications arrangement via an interface of the data carrier arranged for contactless communication. The method may be implemented in conjunction with the communications system 1 shown in FIG. 1 and described above.

The illustrated method 100 includes, at block 102, supplying the identification information in the form of information units via the interface to the communications arrangement. The method 100 also includes, at block 104, receiving and processing an indicator signal. The indicator signal indicates a substantially simultaneous appearance of two different information units. One information unit is contained in the identification information stored in a memory stage of the circuit and the other information unit is contained in different identification information stored in a memory stage of a different circuit. The indicator signal is generated by the communications arrangement upon detection of such a substantially simultaneous appearance of different information units and is communicated to the circuit. The method 100 also includes, at block 106, interrupting the supply of identification information as a consequence of receiving and processing the indicator signal after the supply of the information unit that has caused the indicator signal. The method 100 also includes, at block 108, memorizing at least the information unit that has caused the indicator signal. The illustrated method 100 then ends.

The invention claimed is:

1. A circuit for a data carrier, wherein the data carrier comprises an interface for contactless communication with a communications arrangement, wherein the circuit comprises:
    memory means for storing identification information consisting of information units, wherein the interface is configured to supply the identification information to the communications arrangement, and
    signal processing means that are arranged to receive and process an indicator signal, wherein the indicator signal indicates a substantially simultaneous appearance of two different information units, wherein one information unit is contained in the identification information stored in a memory stage of the circuit for the data carrier, and the other information unit is contained in different identification information stored in a memory stage of a different circuit, and wherein the indicator signal is generated by the communications arrangement upon detection of such a substantially simultaneous appearance of different information units and is communicated to the circuit for the data carrier, and wherein the signal processing means as a consequence of receiving and processing the indicator signal are arranged, firstly, to interrupt the supply of the identification information that has caused the indicator signal and are arranged, secondly, to memorize at least the information unit that has caused the indicator signal.

2. A circuit as claimed in claim 1, wherein the signal processing means comprises:
    a demodulator stage which is arranged to demodulate a carrier signal appearing at the interface and to supply a demodulated carrier signal; and
    a decision stage which is designed to receive the demodulated carrier signal and to decide whether the indicator signal was received.

3. A circuit as claimed in claim 1, wherein the signal processing means comprises a sequence control arrangement, wherein the sequence control arrangement comprises a memory stage, wherein the memory stage is configured to store the position of the information unit within the identification information causing the indication signal.

4. A circuit as claimed in claim 1, wherein the signal processing means are additionally arranged to receive a control signal via the interface and to process the received control signal, wherein the control signal is provided to determine the information unit that has caused the indicator signal and wherein the signal processing means as a consequence of receiving and processing the control signal are arranged to continue the supply of identification information with the information unit succeeding the information unit that has caused the indicator signal when the information unit determined by the control signal is identical with the information unit that has caused the indicator signal.

5. A circuit as claimed in claim 4, wherein the signal processing means are arranged to receive and process the control signal as a component of the indicator signal.

6. A data carrier comprising a circuit as claimed in claim 1.

7. A method for supplying identification information stored by means of a circuit for a data carrier to a communications arrangement via an interface of the data carrier arranged for contactless communication, the method comprising:
    supplying the identification information in the form of information units via the interface to the communications arrangement;
    receiving and processing an indicator signal, wherein the indicator signal indicates a substantially simultaneous appearance of two different information units, wherein one information unit is contained in the identification information stored in a memory stage of the circuit and the other information unit is contained in different identification information stored in a memory stage of a different circuit, and wherein the indicator signal is generated by the communications arrangement upon detection of such a substantially simultaneous appearance of different information units and is communicated to the circuit;
    interrupting the supply of identification information as a consequence of receiving and processing the indicator signal after the supply of the information unit that has caused the indicator signal; and
    memorizing at least the information unit that has caused the indicator signal.

8. A method as claimed in claim 7, wherein a carrier signal appearing at the interface is demodulated and wherein on the basis of the demodulated carrier signal a decision is made as to whether the indicator signal was received.

9. A method as claimed in claim 7, wherein the position of the information unit within the identification information that has caused the indicator signal is stored.

10. A method as claimed in claim 7, wherein a control signal is received via the interface, wherein the control signal is provided to determine the information unit that has caused the indicator signal and wherein, as a consequence of receiving and processing the control signal the supply of the identification information is continued with the information unit succeeding the information unit that has caused the indicator signal when the information unit determined by the control signal is identical with the information unit that has caused the indicator signal.

11. A method as claimed in claim 10, wherein the control signal is received and processed as a component of the indicator signal.

12. A communication arrangement comprising:
- an interface for contactless communication with a data carrier, wherein the interface is configured to receive identification information from the data carrier in the form of information units,
- collision detection means, wherein the collision detection means are arranged to detect a substantially simultaneous appearance of two different information units, wherein one information unit originates from the data carrier and the other information unit originates from a different data carrier, and wherein the collision detection means are arranged to generate an indicator signal and to supply the indicator signal via the interface, wherein the indicator signal indicates the detection of the substantially simultaneous appearance of the two different information units, and
- information unit-processing means, wherein the information unit-processing means, as a consequence of the detection of such a substantially simultaneous appearance of the different information units by the collision-detection means are arranged to store and process every information unit that has appeared before the information unit that has caused the indicator signal.

13. A communication arrangement as claimed in claim 12, wherein the information unit-processing means are additionally arranged to generate a control signal, wherein the control signal is provided to determine the information unit that has caused the indicator signal and to make available the control signal for supply of the control signal via the interface and wherein the information unit-processing means following the supply of the control signal are arranged to store and to process the information unit determined by the control signal together with every information unit that has appeared before the information unit that has caused the indicator signal.

14. A communication arrangement as claimed in claim 13, wherein the collision detection means are arranged to receive the control signal from the information unit-processing means and to supply the control signal as a component of the indicator signal.

* * * * *